(12) United States Patent
Hippelainen

(10) Patent No.: US 7,620,979 B2
(45) Date of Patent: Nov. 17, 2009

(54) SUPPORTING MOBILE INTERNET PROTOCOL IN A CORRESPONDENT NODE FIREWALL

(75) Inventor: Lassi Tapio Hippelainen, Helsinki (FI)

(73) Assignee: Nokia Corporation, Espoo (FI)

( * ) Notice: Subject to any disclaimer, the term of this patent is extended or adjusted under 35 U.S.C. 154(b) by 638 days.

(21) Appl. No.: 10/860,574

(22) Filed: Jun. 4, 2004

(65) Prior Publication Data

US 2005/0135241 A1 Jun. 23, 2005

(30) Foreign Application Priority Data

Dec. 22, 2003 (EP) .................. 03029552

(51) Int. Cl.
*G06F 15/16* (2006.01)
(52) U.S. Cl. .................. 726/11; 726/12; 709/227; 709/229
(58) Field of Classification Search ......... 709/229, 709/230; 380/247–249, 250, 270, 272, 33; 726/1, 2, 11–14
See application file for complete search history.

(56) References Cited

U.S. PATENT DOCUMENTS

2002/0080752 A1 6/2002 Johansson et al.
2002/0147820 A1* 10/2002 Yokote .................. 709/229
2004/0057384 A1 3/2004 Le et al.

FOREIGN PATENT DOCUMENTS

| EP | 1176781 | 1/2002 |
|----|---------|--------|
| EP | 1463257 | 9/2004 |
| WO | WO 03/065682 | 8/2003 |

OTHER PUBLICATIONS

Perkins, C.E., "Mobile IP", IEEE Communications Magazine, vol. 35, No. 5, pp. 84-86 & 91-99, May 1, 1997.*
Johnson, et al., Internet Draft, "Mobility Support in IPv6", Internet Engineering Task Force, Jun. 2003.

* cited by examiner

*Primary Examiner*—Kimyen Vu
*Assistant Examiner*—Edward Zee
(74) *Attorney, Agent, or Firm*—Harrington & Smith, PC

(57) ABSTRACT

A method, system and device for protecting a network node by an access blocking function, such as a correspondent node firewall, are disclosed. The access blocking function protects either a first or a second network node and allows access to the protected network node from the other network node via a link associated to an address of the first network node and an address of the second network node. The second network node is configured to change its address. The method comprises associating the link associated to the old address of the second network node to the new address of the second network node when the second network node changes its address.

29 Claims, 2 Drawing Sheets

SUPPORTING MOBILE INTERNET PROTOCOL IN A CORRESPONDENT NODE FIREWALL

BACKGROUND OF THE INVENTION

1. Field of the Invention

The invention relates to a method and a system for protecting a first network node (e.g., a correspondent node CN) by an access blocking function (e.g., a firewall).

2. Description of the Prior Art

The invention relates in particular to mobile IP (Internet Protocol), wherein a second node having a connection to a first node is a mobile node (MN).

Mobile IPv6 (MIP) will be needed to support roaming across different access technologies, e.g. to augment 3G (third generation) networks with Wireless Local Area Network (WLAN) hot spots. On the other hand, a firewall (FW) is needed to protect a node against malicious packets. However, existing stateful FWs will interfere with MIP route optimization.

Namely, a mobile node is able to change its address. The firewall protects the correspondent node (CN) such that it allows only a link between the mobile node and the correspondent node wherein the link is identified by the addresses of the mobile node and the correspondent node (the link is referred to in the following a so-called "pinhole"). That is, in case the mobile node changes its address from an old CoA (care-of address) to a new CoA, the pinhole is no longer valid. Hence, it is necessary to newly set up the whole connection between the mobile node and the correspondent node again.

This causes an interruption in the traffic between the two nodes, which is annoying for the users. That is, current firewalls do not support mobile IP.

If the FW ignores Binding Updates (BUs) (i.e., avoiding changes in the CoA), MIP route optimization won't work. Many packets coming from the new CoA will be dropped, because they have no matching pinhole. All sessions have to be re-initiated from the new address. Smooth handovers are possible only if all packets are routed via the Home Agent (HA). This, however, means that no route optimization is possible.

SUMMARY OF THE INVENTION

Hence, it is an object of the present invention to allow support of mobile IP also within firewalls.

This object is solved by a method for protecting a network node by an access blocking function, wherein the access blocking function protects either a first or a second network node and allows access to the protected network node from the other network node via a link associated to an address of the first network node and an address of the second network node, wherein the second network node is adapted to change its address, the method comprising the step of, when the second network node changes its address, associating the link associated to the old address of the second network node to the new address of the second network node.

Alternatively, the above object is solved by a network system comprising an access blocking function and at least a first network node and a second network node, wherein the access blocking function is adapted to protect either the first network node or the second network node by allowing access to the protected node from the other node via a link associated to an address of the first network node and an address of the second network node, the second network node is adapted to change its address, and, the access blocking function is adapted to, when the second network node changes its address, associate the link associated to the old address of the second network node to the new address of the second network node.

Furthermore, the above object is solved by an access blocking device, wherein the access blocking device is adapted to protect either a first network node or a second network node by allowing access to the protected node from the other node via a link associated to an address of the first network node and an address of the second network node, to, when the second network node changes its address, associate the link associated to the old address of the second network node to the new address of the second network node.

Hence, according to the invention the existing link (e.g., the pinhole) between the first network node (e.g., the correspondent node) and the second network node (e.g., the mobile node) which was associated to the old address (e.g., old CoA) of the second network node is associated to the new address of the second network node. It is noted that either the first or the second network node may be protected.

In other words, according to the invention, the new address (new CoA) inherits the pinhole(s) of the old address.

Thus, no new setup is required, and the traffic between the two nodes can continue smoothly.

A change of address of the second network node may be detected by detecting a binding update (BU) message from the second network node to the first network node, the binding update message comprising the new address of the second network node.

The new address of the second network node may be stored by the access blocking function without taking it into use. Then, it may be checked whether the new address of the second network node is valid, and, if the new address of the second network node is valid, the link associated to the old address of the second network node may be associated to the new address of the second network node.

During checking whether the new address of the second network node is valid, it may be waited for a binding acknowledgement (BA) message from the first network node to the second network node transmitted in response of a binding update message comprising the new address of the second network node. Then, if the binding acknowledgement message is received, the new address of the second network node can be interpreted as valid. Thus, the check whether the new address is valid (i.e., confirmation of the new address) can be performed by waiting on a BA message.

In case the second network node requests the binding acknowledgement message, the binding acknowledgement message may be forwarded from the access blocking function to the second network node. Otherwise, in case the second network node does not request the binding acknowledgement message, the binding acknowledgement message may be discarded by the access blocking function.

During checking whether the new address is valid, it may be waited for traffic destined to the new address of the second network node. Then, if traffic destined to the new address of the second network node is detected, the new address of the second network node may be interpreted as valid. Hence, the new address can be confirmed by checking whether the address is actually used in traffic.

Furthermore, traffic transmitted between the first and the second network node may be blocked until it has been checked that the new address of the network node is valid.

During this blocking, packets of the blocked traffic may be stored and forwarded to the first network node after it has been checked that the new address of the network node is valid.

Moreover, the binding update message described above may contain an identifier. Then, the binding update message may be blocked in case the identifier does not match with an expected identifier. In this way, a detection of an attack or a faulty packet can be easily performed.

The identifier may be a sequence number of the binding update message which is increased every time a binding update message is sent from the second network node to the first network node, and the expected identifier may be a correspondingly sequence number of the previous binding update message.

Also other kinds of identifiers are possible, for example a Care-of Init Cookie included in a Care-of Test Init (CoTI) message used in a return routability (RR) test may be used.

The binding update message may comprise a timer limiting the lifetime of a binding. Then, the new address of the second network node may be discarded when the lifetime of the binding expires.

Moreover, it may be required that the messages between the first and the second network node fulfill certain message formats. Then, a message (e.g., a binding update (BU) message) may be discarded in case it does not fulfill a required message format.

The access blocking function may be a firewall.

BRIEF DESCRIPTION OF THE DRAWINGS

The invention is described in the following by referring to the attached drawings in which.

DETAILED DESCRIPTION OF THE PREFERRED EMBODIMENT

In the following, a preferred embodiment of the invention is described.

In the embodiment of the invention a case is described in which a Correspondent Node (CN) is protected by a firewall (FW), and receives a MIP (Mobile Internet Protocol) Binding Update (BU) from a Mobile Node (MN) that has moved to a new Care-of Address (CoA). In a typical scenario, the CN is a server and the MN is a laptop or a communicator running client software.

In the following, the embodiment of the present invention is shortly summarized:

The FW handles an incoming BU in several phases:
1. The FW detects the BU to a CN, and stores temporarily the suggested CoA without taking it into use ('pending').
2. The FW forwards the packet to the CN. The CN performs the usual validity checks and responds to the MN with a Binding Acknowledgement (BA) using the new CoA.
3. The FW detects the BA, and interprets it as a confirmation of the new CoA. The new CoA inherits the pinholes previously associated with the old CoA.
4. The FW drops or forwards the BA, depending on if the MN requested it in the BU.

If there is no acceptable response within a reasonable time, the FW keeps the old CoA and rejects the pending new CoA.

Figure 1:
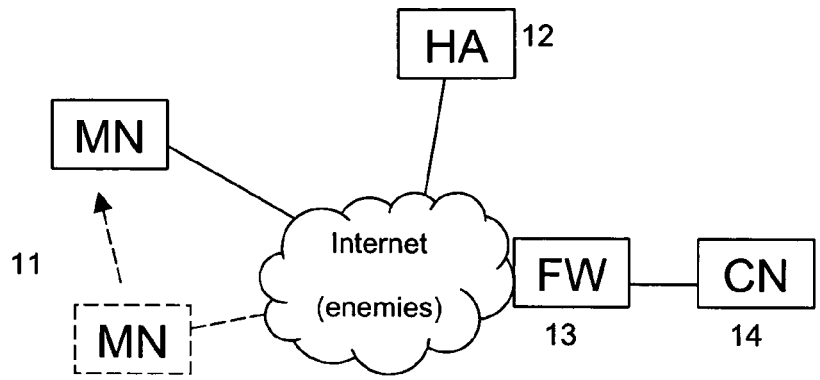
FIG. 1 shows a network layout as used according to the embodiments of the present invention.
Figure 2:
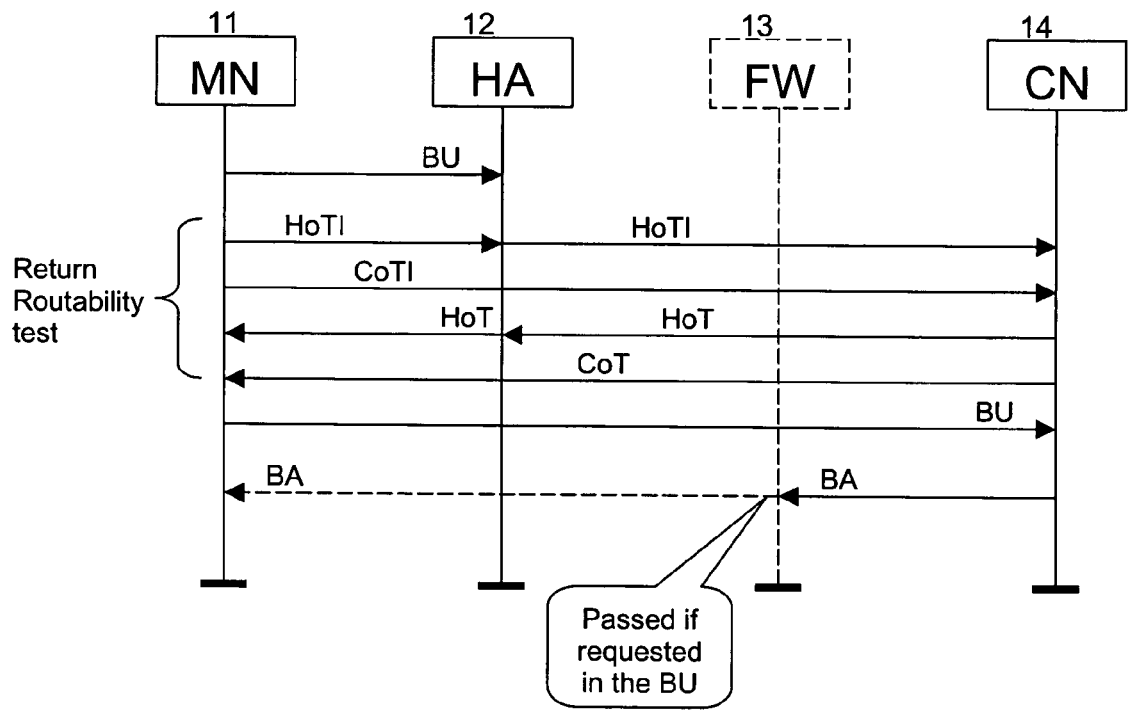
FIG. 2 shows a message flow in a MIP handover according to the first embodiment of the present invention, and FIG. 3 a simplified block diagram of a firewall.

Next, the embodiment is described in more detail by referring to FIGS. 1 and 2.

FIG. 1 shows a network layout and the location of the firewall (FW, indicated by reference numeral 13) in according to the present embodiment of the invention. There are no "enemies" (entities which possibly may attack the CN, indicated by reference numeral 14) between the FW 13 and the CN (or CNs, if a server cluster is protected by the same FW), because they are in the same security domain. Note that the FW 13 needs not protect the HA (Home Agent, indicated by reference numeral 12). In FIG. 1, the change of address of the MN 11 is indicated by moving of the MN (old connection state indicated by the dashed lines, new connection state indicated by the solid lines).

FIG. 2 shows the messages in a MIP handover. It is noted that the FW 13 is not visible to the other elements. Therefore, the FW 13 is indicated by dashed lines. It is noted that in order to simplify the drawing, only those messages are shown which are necessary to describe the procedure according to the present embodiment.

The handover starts with a BU message sent from the MN 11 to its HA 12.

As a preparation for a BU, MIP runs a "Return Routability" test. The FW 13 will pass the corresponding packets to the CN, unless there is some other reason (e.g., malformed content or forbidden address range) to drop them. The incoming test messages are not dangerous to the CN, and the outgoing responses will be filtered at the other end.

In the following, the Return Routability (RR) test and in particular the messages involved are described in some more detail.

In short, the Return Routability procedure is a test by which it can be ensured that the mobile node is in fact addressable at its claimed care-of address as well as at its home address. This test is performed by testing whether packets addressed to the two claimed addresses are routed to the mobile node.

In particular, a so-called Home Test Init (HOTI) message and a Care-of Test Init (COTI) message are sent at the same time from the MN to the CN. It is noted that the HoTI message is sent via the Home Agent (HA), whereas the CoTI message is sent directly (i.e., without involving the HA) to the CN. In case of a successful test, the CN replies with a Home Test (HoT) message sent via the HA and a Care-of Test (CoT) message sent to the MN. These messages forming the Return Routability test are also illustrated in FIG. 2.

The HoTI message comprises as its source address the home address of the MN and as its destination address the CN address. As a parameter, a home init cookie is included which is a random number. This home init cookie has to be returned by the CN later and serves to give some assurance for the MN.

The CoTI message is similar, only that the source address is the care-of address of the mobile node, and that a parameter is a Care-of Init Cookie similar to the home init cookie described above.

The HoT message sent in response to the HoTI message comprises as its source address the CN address, and as its destination address the MN home address. As parameters, the home init cookie and further parameters (e.g., home keygen token and home nonce index, described in detail in the document mentioned above) which a allow an improved security.

The CoT message sent in response to the CoTI message is similar to the HoT message. That is, the CoT message comprises as its source address the CN address, as its destination address the MN care-of address and several parameters such as the Care-of Init Cookie and further parameters such as a care-of keygen token and care-of nonce index.

Moreover, the header of all messages described above (i.e., HoTI, CoTI, HoT and CoT) contains (among other items) a Mobility Header (MH) Type. The MH Type is an 8-bit selector and identifies the particular mobility message in question. For example, for a CN proper values are 1, 2 or 5. In case the CN should be mobile itself, it needs to receive 0, 3 or 4.

With respect to the above-described RR messages, the HotI message uses the NH Type value 1, and the CoTI message uses the MH Type value 2. On the other hand, the HoT message uses the NH Type value 3, and the CoT message uses the NH Type value 4.

As described earlier, it is necessary that the FW passes the messages necessary for the RR test. That is, packets with mobility headers are passed, if the MH type is appropriate. Moreover, if the FW protects a network that has its own HA, some other types sent to the HA must also be accepted.

Hence, in this way the RR test can also be carried out through a firewall.

According to a variation of the present embodiment, the firewall may also check the validity of the messages sent during the RR test. That is, the firewall can pick the Care-of Init Cookie from the CoTI and compare it to the Care-of Init Cookie included in the CoT message of the CN. In case both cookies do not match, the FW may drop the CoT message.

The CN will accept a BU only from a node that passes the Return Routability test. The CN should then send a BA to the MN, which the FW can detect and treat as a confirmation of the CoA. Note that the message must be analyzed, because it may be sent also as an error report to a failing BU. Any errors will cause the FW to reject the pending CoA. If the MN didn't request a BA in the BU, the FW will drop it after confirming the CoA.

However, according to the standard the CN need not send a BA, unless the MN explicitly requests it. In this case the FW has to wait for some other packet going to the pending CoA. The waiting time should be a configuration parameter.

Namely, it can be assumed that there will be traffic very soon, or the MN wouldn't have sent a BU. This opens a possibility for a "pinhole hijack" attack: the attacker sends a fake BU with a CoA of a node that the CN communicates with for other reasons. In this case the FW accepts the wrong CoA as confirmed, because it sees traffic to the "new" CoA, and associates the pinholes of the MN with it.

Requiring that the response to the new CoA must be a BA can prevent this attack. Note that the CN won't be fooled in the "pinhole hijack" attack (the fake BU fails the security check) but the FW just doesn't know it. The damage is limited to minor annoyance, because in the typical scenario the MN will refresh the sessions, reopening the needed pinholes. Protocols like TCP do it automatically.

Nevertheless, according to a preferred variation of the first embodiment, it should be mandatory that the CN sends a BA, as shown in FIG. 2. In case the MN has explicitly requested a BA in the BU, the FW forwards the BA to the MN (as indicated in FIG. 2 by the dashed arrow). Otherwise, the BA may be dropped, such that the BA is only used in order that the FW can confirm the correct CoA.

Packets arriving from the new CoA will be stopped by the FW until the new CoA has been confirmed. For smooth service they should be stored temporarily instead of dropping them immediately. They can then be forwarded later when the CoA is confirmed. However, this increases the FWs vulnerability to DoS (Denial of Service) attacks by flooding, and should be a configuration option. To expedite the transition from 'pending' to 'confirmed' is another reason why the CN should send a BA for each BU.

According to a variation of the embodiment, also another countermeasure against the "pinhole hijack" attack (the attacker sends a fake BU with a CoA of a node that the CN communicates with for other reasons) is possible. In detail, according to this variation, the FW is adapted to drop any BU's which have not been preceded by a CoTI.

That is, each transmission of a CoTI message may be stored, such that on receiving a BU it can be checked whether a CoTI message was transmitted between the two network nodes involved. If there is not CoTI message (or a transmission of a CoTI message) stored in the FW, the BU is dropped.

The embodiment and its variations according to the present invention can be implemented as a straightforward addition to existing FWs.

As a further preferred variation of the embodiment described above, the FW should also check those MIP details that can be checked by reading the messages, in order to increase security.

For example:

In the MIP standards, certain required message formats are defined. In this way, invalid packets can be recognized by the FW, so that the FW may drop packets that fail to fulfill the required message formats. The FW can test most of them, offloading the checks from the CN.

The above mentioned required message formats may include the following rules:

The checksum of packet should be verified. The checksum is a field in the Mobility Header (MH) and contains the checksum of the MH.

Furthermore, the MH comprises the MH Type field described above, and the MH Type field must have a known value.

The MH also comprises a Payload Proto field which is an 8-bit selector and identifies the type of header immediately following the Mobility Header. The Payload Proto field must be IPPROTO_NONE (59decimal) which is a predetermined value defined for the MH.

A Header Len field of the Mobility Header should be less than the length specified for this particular type of message.

Further MIP details that the FW can check by reading the messages, may include the following:

The BU contains a sequence number. The FW should drop out-of-sequence BUs before they reach a CN. That is, for each new BU, the sequence number is increased, so that the FW can expect a certain sequence number for a new BU by referring to an old BU. Hence, if the expected sequence number does not coincident with the actual sequence number of the BU, the BU is discarded.

As a further alternative, the BU may comprise some other kind of identifier, which should be known to the FW. If the detected identifier of a BU does not coincide with an expected identifier, the BU is discarded. The identifier may be changed in a way know to the FW, similar to the sequence number described above.

For example, as the identifier described above also the Care-of Init Cookie may be used. This requires that the MN includes the Care-of Init Cookie also into the BU and that the FW stores the Care-of Init Cookie during the RR test. Thus, preferably this measure may be combined with the variation of the embodiment described above according to which the Care-of Init Cookies of the CoTI and COT messages are compared during the RR test.

The BU contains a timer that limits the lifetime of a binding. The FW should check this timer and discard a CoA when its binding expires. This will also flush old pinholes out of the FWs memory.

The invention as described above with respect to the preferred embodiment and its variations achieves the following advantages:

The invention works without changes to existing protocols, MNs, CNs, or HAs. Hence, it the invention can easily be implemented as an addition to existing elements.

The FW does not participate in trust relationships or key management.

The FW does not perform cryptographic computations.

The above description and accompanying drawings only illustrate the present invention by way of example. Thus, the embodiment and its variations may vary within the scope of the attached claims.

For example, the invention is not restricted to firewalls, but may be applied to any kind of access blocking functions which fulfill a similar function.

Moreover, the invention is not limited to MIP but can be applied to any transport protocols in which one of the node involved in a connection may change its address.

Furthermore, in the above-described embodiment the protected node, i.e., the CN, has a fixed address. However, also the CN may be a mobile node and may changes its address. That is, for example, only the protected node may change its address wherein the other node may use a fixed address.

Moreover, the access blocking function may protect a plurality of network nodes, i.e., a cluster of correspondent nodes (CNs).

The access blocking function (e.g., the firewall) may be implemented by software. It can be integrated in the software running at the CN, for example, or may be part of another network element (base station or the like). Alternatively, the access blocking function may be implemented as hardware, for example, as a stand-alone network element.

Figure 3:
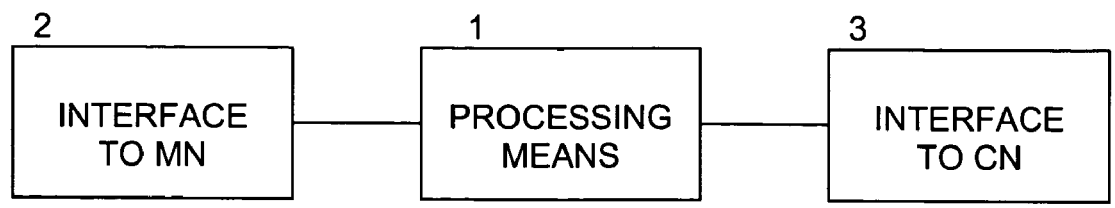

As illustrated in FIG. 3, the access blocking function or device may comprise a processing means 1 and two interfaces 2 and 3. Each of the interfaces establishes a connection to a network element (e.g., MN and CN in the above examples). The processing means 1 is adapted to carry out the procedures according to the present invention. That is, the processing means 1 controls whether a connection (and in which direction) between the two network nodes is allowed or not.

The interfaces 2 and 3 are logical interfaces. That is, the number of physical interfaces does not have to match the number of logical interfaces. The logical interfaces are mapped on the physical interfaces.

That is, that the number of interfaces (logical and physical interfaces) of the access blocking function (firewall) is not limited to two interfaces. For example, a firewall comprising three interfaces is possible which separates Intranet, Extranet and the Internet. Furthermore, also more interfaces are possible.

On the other hand, also a firewall with only one interface is possible. This is connected to a switch that sends all in- or outbound packets to a FW (and other elements such as NAT (Network Address Translator), VPN (Virtual Private Network) and virus scanner, for example), independent of the destination, and forward all packets coming from the firewall to the destination address. In this way, each packet that deals with the outside world passes twice through the switch and is handled in the firewall between the passes.

In addition, the embodiment and its variations may be arbitrarily combined. That is, different kind of protection mechanisms may be combined in order to enhance security.

What is claimed is:

1. A method, comprising:
protecting a network node by a firewall, wherein the firewall protects either a first or a second network node and allows access to the protected first or second network node from the other network node only via a link associated to an address of the first network node and an address of the second network node, wherein the second network node is configured to change its address from an old address to a new address;
storing the new address of the second network node in the firewall without taking the new address into use;
checking whether the new address of the second network node is valid; and
associating the link associated to the old address of the second network node to the new address of the second network node when the new address of the second network node is valid.

2. The method according to claim 1, further comprising:
detecting a change of address of the second network node by detecting a binding update message from the second network node to the first network node, wherein the binding update message comprises the new address of the second network node.

3. The method according to claim 1, wherein the checking comprises waiting for a binding acknowledgement message from the first network node to the second network node transmitted in response of a binding update message comprising the new address of the second network node, and interpreting the new address of the second network node as valid when the binding acknowledgement message is received.

4. The method according to claim 3, further comprising:
forwarding the binding acknowledgement message from the firewall to the second network node when the second network node requests the binding acknowledgement message.

5. The method according to claim 3, further comprising:
discarding the binding acknowledgement message by the firewall when the second network node does not request the binding acknowledgement message.

6. The method according to claim 1, wherein the checking comprises waiting for traffic destined to the new address of the second network node, and interpreting the new address of the second network node as confirmed valid when the traffic destined to the new address of the second network node is detected.

7. The method according to claim 1, further comprising:
blocking traffic transmitted between the first and the second network node until the new address of the second network node is determined valid.

8. The method according to claim 7, wherein the blocking comprises storing and forwarding packets of the blocked traffic to the first network node after the new address of the network node is determined valid.

9. The method according to claim 2, the method further comprising:
blocking the binding update message in case the identifier does not match with an expected identifier, wherein the binding update message contains an identifier.

10. The method according to claim 9, wherein the identifier comprises a sequence number of the binding update message that is increased every time a binding update message is sent from the second network node to the first network node, and the expected identifier comprises a correspondingly sequence number of the previous binding update message.

11. The method according to claim 2, the method further comprising:
discarding the new address of the second network node when a lifetime of a binding expires, wherein the binding update message comprises a timer limiting the lifetime of the binding.

12. The method according to claim 1, further comprising:
discarding a message when the message fails to fulfill a required message format.

13. The method according to claim 12, wherein the discarding comprises discarding the message, wherein the message comprises a binding update message.

14. An apparatus, comprising:
a processor configured to carry out a firewall function by protecting either a first network node or a second network node by allowing access to the protected first or second node from the other node only via a link associated to an address of the first network node and an address of the second network node, wherein
the processor is configured to
store, when the second network node changes its address from an old address to a new address, the new address of the second network node in storage without taking the new address into use,
check whether the new address of the second network node is valid, and
associate the link associated to the old address of the second network node to the new address of the second network node when the new address of the second network node is valid.

15. The apparatus according to claim 14, wherein the processor is further configured to detect a change of the address of the second network node by detecting a binding update message from the second network node to the first network node, wherein the binding update message comprises the new address of the second network node.

16. The apparatus according to claim 14, wherein the processor is further configured to wait during confirming of the new address of the second network node for a binding acknowledgement message from the first network node to the second network node transmitted in response of a binding update message comprising the new address of the second network node, and to interpret the new address of the second network node as valid when the binding acknowledgement message is received.

17. The apparatus according to claim 16, wherein the processor is further configured to forward the binding acknowledgement message to the second network node when a request from the second network node to forward the binding acknowledgement message is received.

18. The apparatus according to claim 16, wherein the processor is further configured to discard the binding acknowledgement message in case no request to forward the binding acknowledgement message is received from the second network node.

19. The apparatus according to claim 14, wherein the processor is further configured to wait during checking whether the new address of the second network node is valid for traffic destined to the new address of the second network node, and to interpret the new address of the second network node as valid when traffic destined to the new address of the second network node is detected.

20. The apparatus according to claim 14, wherein the processor is further configured to block traffic transmitted between the first and the second network node until the new address of the network node is determined valid.

21. The apparatus according to claim 20, wherein the processor is further configured, when traffic is blocked, to store packets of the blocked traffic and to forward the stored packets to the first network node after the new address of the network node is determined valid.

22. The apparatus according to claim 15, wherein the binding update message comprises an identifier and the apparatus is configured to block the binding update message when the identifier does not match with an expected identifier.

23. The apparatus according to claim 22, wherein the identifier comprises a sequence number of the binding update message that is increased every time a binding update message is sent from the second network node to the first network node, and the expected identifier comprises a corresponding sequence number of a previous binding update message.

24. The apparatus according to claim 15, wherein the binding update message comprises a timer limiting a lifetime of a binding, and the processor is further configured to discard the new address of the second network node when the lifetime of the binding expires.

25. The apparatus according to claim 14, wherein the processor is further configured to discard a message when the message does not fulfill a required message format.

26. The apparatus according to claim 25, wherein the message comprises a binding update message.

27. The apparatus according to claim 14, wherein the processor is further configured to
establish a connection to the first network node,
establish a connection to the second network node, and
perform a protection of either the first network node or the second network node and associating the link between the two network nodes.

28. An apparatus, comprising:
protecting means for protecting either a first network node or a second network node by allowing access to the protected first or second node from the other node only via a link associated to an address of the first network node and an address of the second network node;
storing means for storing, when the second network changes its address from an old address to a new address, the new address of the second network node in the protecting means without taking the new address into use;
checking means for checking whether the new address of the second network node is valid; and
associating means for associating the link associated to the old address of the second network node to the new address of the second network node when the new address of the second network node is valid.

29. A computer program embodied on a computer readable storage medium, the computer program configured to control a processor to perform a process, the process comprising:
protecting either a first network node or a second network node by a firewall by allowing access to the protected first or second node from the other node only via a link associated to an address of the first network node and an address of the second network node;
storing, when the second network changes its address from an old address to a new address, the new address of the second network node in the firewall without taking the new address into use;
checking whether the new address of the second network node is valid; and
associating the link associated to the old address of the second network node to the new address of the second network node when the new address of the second network node is valid.

* * * * *